United States Patent [19]

Bruijne et al.

[11] Patent Number: 5,211,979

[45] Date of Patent: May 18, 1993

[54] POLYOL FATTY POLYESTERS HAVING NEWTONIAN RHEOLOGY

[75] Inventors: Dirk W. Bruijne; Wilhelmus A. Castenmiller, both of Vlaardingen; Theodorus J. Liefkens, Maassluis; Johannus de Looff, Rhoon; Volkmar K. Müller, 's-Gravenhage, all of Netherlands

[73] Assignee: Van den Bergh Foods Co., Division of Conopco, Inc., Lisle, Ill.

[21] Appl. No.: 732,030

[22] Filed: Jul. 18, 1991

[30] Foreign Application Priority Data

Jul. 20, 1990 [EP] European Pat. Off. ........ 90201986.8

[51] Int. Cl.$^5$ ............................................. A23D 9/00
[52] U.S. Cl. .................................. 426/601; 426/804; 536/119
[58] Field of Search ...................... 426/601, 611, 804; 536/119

[56] References Cited

U.S. PATENT DOCUMENTS

| | | |
|---|---|---|
| 3,600,186 | 8/1971 | Mattson et al. ............... 426/611 |
| 4,005,195 | 1/1977 | Jandacek . |
| 4,005,196 | 1/1977 | Jandacek et al. . |
| 4,034,083 | 7/1977 | Mattson . |
| 4,940,601 | 7/1990 | Orphanos et al. . |

FOREIGN PATENT DOCUMENTS

| | | |
|---|---|---|
| 0233856 | 8/1967 | European Pat. Off. . |
| 0235836 | 9/1987 | European Pat. Off. . |
| 0236288 | 9/1987 | European Pat. Off. . |
| 0271951 | 6/1988 | European Pat. Off. . |
| 0291106 | 11/1988 | European Pat. Off. . |
| 0311154 | 4/1989 | European Pat. Off. . |
| 0350987 | 1/1990 | European Pat. Off. . |

OTHER PUBLICATIONS

Mattson, J. Nutr. 109, 1688–1693 (1979); "The Effect of a Non-Absorbable Fat, Sucrose Polyester, on the Metabolism of Vitamin A by the Rat".

Communication Dated Feb. 13, 1991 from Proctor & Gamble to the Patent Office.

Primary Examiner—Joseph Golian
Assistant Examiner—Evan Federman
Attorney, Agent, or Firm—Gerard J. McGowan, Jr.

[57] ABSTRACT

The present invention is concerned with a fat composition comprising a mixture of one or more polyol fatty acid polyesters, which mixture exhibits Newtonian rheology at solid fat content of at least 15%, and with a fatty acid distribution which complies with the condition:

$$PY < 1.1$$

where $$PY = 2.94*y + 2.1*x + 16.6*y^2 + 2.7*x^2 + 14.6*x\text{-}y - 0.26$$

wherein $x = [P] - [M]$ and $y = [S] - [P]$ and PY means predicted yield and which in the same time complies with each of the following conditions:

$$[B] < 0.35$$

either $[P] < 0.40$ or $[P] < 0.65$ and $[L] < 0.15$, wherein [P] is the molar fraction of palmitic acid residues, [M] is the molar fraction of myristic acid residues and [S] is the molar fraction of stearic acid and longer saturated fatting acid residues, [B] is the molar fraction of lauric and shorter fatty acid residues, [L] is the molar fraction of saturated fatty acid residues having a carbon chain length of at least 20. The present composition displays newtonian rheology even when containing a substantial amount of solid fat, which is advantageous in the preparation of, e.g., flowable fat products.

11 Claims, 1 Drawing Sheet

POLYOL FATTY POLYESTERS HAVING NEWTONIAN RHEOLOGY

BACKGROUND OF THE INVENTION

1. Field of the Invention

The present invention generally relates to new fat compositions, more particularly the present invention is concerned with fat compositions containing a mixture of one or more polyol fatty acid polyesters which exhibit Newtonian rheology even at high solid fat content.

2. Description of the Related Art

Polyol fatty acid polyesters, and in particular, the sugar fatty acid polyesters, such as e.g. the sucrose fatty acid polyesters (SPE'S), are known as suitable low-calorie fat-replacers in edible products. They are substantially indigestible for human beings. They have physical and organoleptic properties very similar to the triglyceride oils and fats conventionally used in food products. Polyol fatty acid polyesters are also used as pharmaceutical agents e.g. in view of their ability to prevent fat-soluble substances, such as in particular cholesterol, from being absorbed in the gastro-intestinal tract.

Edible fat-containing products comprising indigestible polyol fatty acid polyesters are known in the art, and described in e.g. U.S. Pat. Nos. 3,600,186, 4,005,195, 4,005,196, 4,034,083 and EP 0 233 856, EP 0 236 288, and EP 0 235 836.

In the above art it is observed that in food products the use of polyol fatty acid polyesters which are liquid at body temperature, may give rise to the so-called problem of anal leakage. In EP 0 235 836 it is suggested to use polyol fatty acid polyesters exhibiting non-Newtonian pseudoplastic rheology to overcome the problem of anal leakage.

Polyol fatty acid polyesters displaying non-Newtonian pseudoplastic rheology have the disadvantage that they can not be applied at high concentration levels in flowable food products such as pumpable shortenings, liquid frying margarines or liquid toppings. Furthermore polyesters of the latter type appear to have an adverse influence on the oral response of particular food products, in particular if said polyesters contain solid fat at a temperature of 35° C.

European patent application EP 0 350 987 deals with SPE'S which have a slip melting point of more than 25° C. and a transition time of more than 60 seconds. These are not contained in the present invention because of the conditions set for the molar fractions of lauric and shorter fatty acid residues, palmitic acid residues and saturated fatty acid residues having a carbon chain length of at least 20.

SUMMARY OF THE INVENTION

It has been found that mixtures of polyol fatty acid polyesters, characterized by a specific distribution of residues of myristic, palmitic and stearic acid including longer saturated fatty acid residues, display Newtonian rheology at unexpectedly high solid fat contents.

DETAILED DESCRIPTION

The present invention is particularly concerned with a fat composition comprising a mixture of one or more polyol fatty acid polyesters, which mixture exhibits Newtonian rheology at solid fat content N of at least 15%, and with a fatty acid distribution which complies with the condition:

$$PY < 1.1$$

where $$PY = 2.94*y + 2.1*x + 16.6*y^2 + 2.7*x^2 + 14.6*x\text{-}y - 0.26$$

wherein $x = [P] - [M]$, $y = [S] - [P]$ and PY means predicted yield and which in the same time complies with each of the following conditions:

$$[B] < 0.35$$

either $[P] < 0.40$ or $[P] > 0.65$
and $[L] < 0.15$, wherein [P] is the molar fraction of palmitic acid residues, [M] is the molar fraction of myristic acid residues and [S] is the molar fraction of stearic acid and longer saturated fatty acid residues, [B] is the molar fraction of lauric and shorter fatty acid residues, [L] is the molar fraction of saturated fatty acid residues having a carbon chain length of at least 20. It should be noted that "molar fraction" with respect to fatty acid residues is meant to denote the molar fraction calculated on the total molar amount of fatty acid residues, inclusive of non-esterified hydroxyl groups comprised in the mixture of polyol fatty acid polyesters.

DESCRIPTION OF THE DRAWINGS

The surface of the polygon of FIG. 1 encompasses the combinations of residues of myristic, palmitic and/or stearic acid including $>C_{18}$ saturated fatty acids, which are covered by the present invention.

$N_c$ denotes the critical solid fat content, i.e. the maximum solid fat content at which the measured yield value is only but just below 250 Pa, which is for a specific fat composition the maximum solid fat content at which the composition is said to display Newtonian rheology. Consequently the invention provides fat compositions which are characterized by a $N_c$ which, is at least 15. The $N_c$-value for a particular fat composition can suitably be determined by measuring the yield value for said composition as a function of the solid fat content (N-value) of said composition. Interpolation of the curve provides the $N_c$-value. In order to obtain reproducible results, it is crucial that the values for solid fat content and yield are measured after the fat samples have been subjected in an identical manner to a temperature treatment as described hereinafter.

Figure 1:
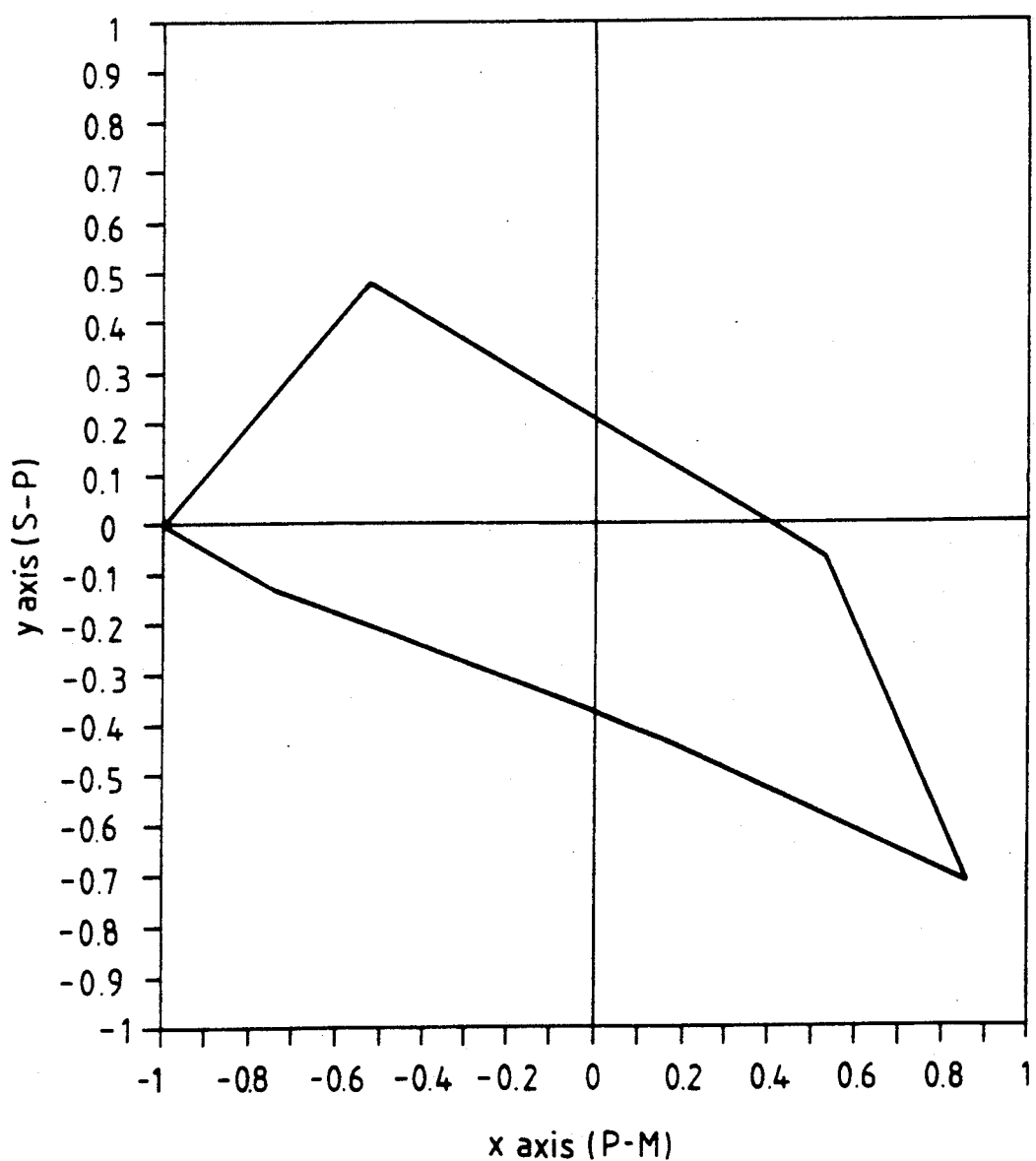

The solid fat content at a particular temperature, whenever referred to in this document, is indicated by the so called N-value measured at that particular temperature t and is denoted as $N_t$. It can conveniently be measured by means of NMR, as described in Fette, Seifen, Anstrichmittel 80 (1978), 180-186 with the proviso that the fat first has to be heated to a temperature of 70° C. or higher for at least half an hour or until the sample is completely melted. The melted sample should then be allowed to crystallize for 24 hours at measurement temperature. The viscometer temperature is to be adjusted to the sample temperature.

The yield value, unless indicated otherwise, can suitably be measured by means of a Rheolab ™ MC 10 viscometer provided with two parallel plates. The degree of deformation is recorded as a function of stress which is linearly increased from 0 to 500 Pa in 60 seconds. The yield value is the stress at the intersect of the horizontal axis (at strain=0) and the tangent to the curve obtained at a stress of 250 Pa.

In this specification, unless otherwise indicated, the term 'fat' refers to edible fatty substances in a general sense, including natural or synthesized fats and oils consisting essentially of triglycerides such as, for example, soybean oil, sunflower oil, palm oil, palm kernel oil, coconut oil, babassu oil, butter oil, fish oil, lard and tallow, which may have been partially or completely hydrogenated, interesterified, fractionated, or modified otherwise, as well as to non-toxic fatty materials having properties similar to triglycerides, which materials may be indigestible, such as, for example, waxes, e.g. jojoba oil and hydrogenated jojoba oil, and polyol fatty acid polyesters referred to hereinafter in more detail. The terms fat and oil are used interchangeably.

In this specification the term 'polyol' is intended to refer to any aliphatic or aromatic compound which comprises at least four free hydroxyl groups. Such polyols in particular include the group of sugar polyols, which comprises the sugars, i.e. the mono-, di-and polysaccharides, the corresponding sugar alcohols and the derivatives thereof having at least four free hydroxyl groups. Examples of sugar polyols include glucose, mannose, galactose, xylose, fructose, sorbose, tagatose, ribulose, xylulose, maltose, lactose, cellobiose, raffinose, sucrose, erythritol, mannitol, lactitol, sorbitol, xylitol and alpha-methylglucoside. A generally used and preferred sugar polyol is sucrose.

In this specification with 'non-digestible material' is meant that at least about 70% by weight of the material concerned is not digested in the human body.

Polyol fatty acid polyesters have been defined in general chemical terms hereinbefore. Preferably, polyol fatty acid polyesters are applied which are derived from sugars or sugar alcohols and in particular from disaccharides, such as sucrose.

In general fatty acids per se or naturally occurring fats and oils may be used as a source for the fatty acid residues in the polyol fatty acid polyesters. Suitable sources of the fatty acid residues are vegetable oils and fats, in particular partially or fully hydrogenated lauric fats, e.g. palm kernel oil, coconut oil and babassu oil. Conventional techniques may be used to provide fats with the desired slip melting points. Suitably, such techniques include full or partial hydrogenation, interesterification, transesterification and fractionation, and may be used before or after conversion of the fatty acid residues with the polyols to polyol fatty acid polyesters.

In the polyol fatty acid polyesters according to the present invention, on average, more than 70% of the polyol hydroxyl groups have been esterified with fatty acids. Preferably polyol fatty acid polyesters are used of which, on average, more than 85% or even over 95% of the polyol hydroxyl groups have been esterified with fatty acids. In this specification the term "polyesters" refers to the polyol fatty acid polyesters as described above.

The advantages of the present Newtonian polyesters are clearly perceptible in particular in fat compositions containing a significant amount of solid fat at ambient temperature. According to a preferred embodiment of the present invention a mixture of polyesters is provided, which at a temperature of 20° C. has a solid fat content of at least 15% and which nevertheless displays Newtonian rheology ($N_c \geq 15$).

The present mixture of polyesters, preferably, contains a limited amount of unsaturated and short chain fatty acids residues. More particularly, in a preferred embodiment, the unsaturated fatty acid residues and lauric and shorter fatty acid residues constitute less than 50 mol. % and more preferably even less than 30 mol. % of the total amount of fatty acid residues. Lauric acid residues preferably constitute less than 30 mol. % and more preferably less than 25 mol. % of the total amount of fatty acid residues.

According to another preferred embodiment of the invention the amounts of myristic, palmitic, stearic and longer saturated fatty acid residues are chosen such that the PY-value is less than 0.63, with the proviso that the molar fractions [B], [P] and [L] are as defined before.

The mixture of polyesters in the fat composition according to the invention can suitably contain residues of fatty acids other than myristic, palmitic and stearic acid including longer saturated fatty acids. Said mixture can suitably contain $C_6$–$C_{13}$ saturated and unsaturated fatty acid residues. Also $C_{19}$–$C_{24}$ unsaturated fatty acid residues may be present, but, preferably, these constitute a minor fraction of the total amount of fatty acid residues in the mixture of polyesters. Thus, according to a very preferred embodiment at least 45 mol. % of the total amount of fatty acid residues present in the mixture of polyesters is constituted by the group of myristic, palmitic and stearic acid including longer saturated fatty acid residues and more preferably is constituted by the group of myristic, palmitic and stearic acid.

Preferably less than 15 mol. % and more preferably less than 10 mol. % of all fatty acid residues in the polyol fatty acid polyesters of the present composition have a carbon chain length of 10 or less. Fatty acid residues of a chain length of 20 or more are present in an amount of, preferably, less than 12 mol. % and, more preferably, of less than 10 mol. %.

In a preferred embodiment of the present invention the distribution of fatty acid residues is such that:

$x < 0.3$ or $x > 0.6$ where x and y are as defined before. More preferably $x < 0.2$ or $x > 0.7$.

According to a very preferred embodiment the mixture of polyesters contains more myristic than palmitic acid residues, in short: $x < 0$.

It is noted that the present invention also encompasses mixtures of polyesters which contain not more than one or two types of fatty acid residues selected from the group consisting of myristic, palmitic and stearic acid residues. Preferably the mixture of polyesters contains at least 10 mol. % myristic acid residues. According to an even more preferred embodiment the mixture of polyesters contains more myristic acid residues than lauric acid residues.

As observed above, the adverse influence of high solid fat levels on oral response is less pronounced for the present fat compositions containing a mixture of Newtonian polyesters than for fat compositions containing a mixture of non-Newtonian polyesters having the same amount of solid fat. The favourable effect is particularly appreciated in case the used mixture of polyesters is relatively high melting, i.e. if said mixture has an $N_{35}$ value of at least 5, more preferably of at least 8 and most preferably of at least 12.

Triglyceride oil can suitably be included in the present composition as the balance of the fat present therein, in an amount of up to 80 wt. %, but preferably in an amount of less than 70 wt. % of the total fat. The fat composition preferably contains at least 20%, more preferably at least 30% polyol fatty acid polyesters by weight of the total fat contained therein.

Suitable triglyceride oils and fats which may be incorporated in the present fat composition include coconut oil, palm kernel oil, palm oil, butter fat, soybean oil, safflower oil, cotton seed oil, rape seed oil, poppy seed oil, corn oil, sunflower oil and mixtures thereof. These oils can suitably be modified by hydrogenation, fractionation and/or interesterification to provide a fat with the desired melting characteristics. Preferably, the fat in the present composition essentially consists of one or more polyol fatty acid polyesters and triglyceride fats.

A mixture of polyol fatty acid polyesters with a fatty acid distribution according to the present invention may be prepared either directly from a polyol or reactive derivative and a proper mixture of fatty acids or a reactive derivative thereof or by blending ready polyesters such that the desired fatty acid distribution is obtained.

According to a preferred embodiment of the invention the amounts of myristic, palmitic, stearic and longer saturated fatty acid residues in the SPE mixtures used in the flowable fat product are chosen such that the PY-value is less than 2.5, more preferably less than 1.1 and most preferably less than 0.63.

According to another preferred embodiment for the flowable fat product a mixture of polyesters is used which contains 12% solid fat or more at a temperature of 20° C. and which displays Newtonian rheology ($N_c \geq 12$). In a most preferred embodiment the mixture of polyesters has a critical solid fat content of 15% or more ($N_c \geq 15$).

The fat composition according to the present invention may comprise in addition to the polyol fatty acid polyesters and optionally the triglyceride fats other ingredients conventionally used in food products, including water, colouring agents, flavouring agents, emulsifiers, anti-foams, such as silicon oils, antispattering agents, anti-oxidants, such as naturally present or added tocopherols, butylated hydroxytoluene, butylated hydroxyanisole and butylated hydroxyquinone, carboxylic acids such as sorbic acid, citric acid and ascorbic acid and flavouring agents.

Examples of food products encompassed by the invention are: frying fats, cooking oils, shortenings, kitchen margarine, bakery margarine, ice cream, mayonnaise, dressings and chocolate. The present Newtonian mixture of polyesters can be applied particularly beneficially in pumpable shortenings and margarines, and in ice cream. The fat composition according to the present invention preferably contains more than 10 wt. %, more preferably more than 50 and most preferably even more than 75 wt. % fat.

In a preferred embodiment the composition essentially consists of one or more non-digestible polyol fatty acid polyesters. A further embodiment of the invention is the use of the present fat composition for the preparation of a fat product, containing triglyceride fat, which is flowable at 20° C., although it contains at said temperature at least 8% solid fat by weight of the total fat content. Examples of such flowable products are fluid shortenings, fluid margarines, fluid toppings and fluid sauce concentrates.

For the purpose of the present invention the property flowability is defined at 20° C. Preferred products are flowable also at 15° C.

Accordingly, a particular embodiment of the present invention is a flowable fat product comprising at least 50, preferably at least 70 wt. % fat, said fat essentially consisting of a mixture of one or more polyol fatty acid polyesters and triglyceride fats wherein the product contains at 20° C. at least 8% solid fat by weight of the total amount of fat.

It is surprising that the application of the mixture of polyesters in accordance with the present invention enables the preparation of fat products which are still flowable in spite of a solid fat content which is 8% or 12% or even more. With fats consisting solely of triglycerides it is basically impossible to prepare a fat product which is flowable when the solid fat content exceeds 8%.

The present flowable product can suitably comprise 5–80 wt % triglyceride fat by weight of total fat. According to a preferred embodiment the fat present in the flowable product consists of 30–80 wt. % polyol fatty acid polyesters and 70–20 wt. % triglyceride fat.

The advantages of the present mixture of polyesters with Newtonian rheology are particularly appreciated if the mixture of polyol fatty acid polyesters is used in an amount of 25 and preferably 35 wt. % of the total fat. Mixtures of polyesters which are particularly suited for preparing the present flowable product are the same as the mixtures mentioned earlier for inclusion in the fat compositions referred to above.

The present flowable product can suitably contain ingredients other than polyol fatty acid polyesters, in particular triglycerides and water. Preferably, polyesters, triglycerides and water together constitute at least 80 wt. % of the flowable product.

Flowable fat products are characterized by a yield value of less than 1200 Pa. Preferably the yield value is less than 1000 Pa, more preferably less than 800 Pa and most preferably less than 700 Pa. The yield value of a sample is measured at 20° C., e.g. by means of a Ferranti Shirley TM viscometer, after the sample has been stored for at least 2 weeks at 20° C. The sample is to be loaded onto the plate, which is kept at 20° C., and the rotation speed is increased from 0 to 1000 $s^{-1}$ in 60 seconds during which period the stress is recorded as a function of the strain applied.

The flowable fat products according to the invention are usually rather soft, in particular in relation to its relatively high solid fat content. Generally the present fat product, after having been stored for at least 2 weeks at 20° C., has a hardness value ($S_{20}$) of less than 40. The $N_{20}$ value of the fat phase of the present product generally does not exceed 40. Preferably the ratio of $S_{20}$ to $(N_{20})^2$ is less than 0.15, more preferably less than 0.10. According to another preferred embodiment $S_{20}$ is less than 30.

The hardness value is the force in grams necessary to penetrate a sample by a bar probe over a pre-set distance, using a Stevens-LFRA Texture Analyser provided with a stainless steel cylindrical probe having a diameter of 4.4 mm. The penetration measurement should be carried out on a sample of relatively large volume (at least 100 gram).

The instrument should be operated in its "normal" mode over a penetration depth of 10 mm and applying a penetration rate of 2.0 mm/s. The measurements should be done at least 2 cm from the sample's edge and at least 2.5 cm of each other. The S-value is the mean figure of three measurements.

The invention is further illustrated by the following examples:

EXAMPLE 1

A sucrose polyester (or rather mixture of sucrose polyesters) was prepared having the following fatty acid residue composition:

| Fatty acid residue | mol fraction |
| --- | --- |
| Linoleic acid | 0.12 |
| Oleic acid | 0.05 |
| Elaidic acid | 0.03 |
| Stearic acid | 0.11 |
| Palmitic acid | 0.53 |
| Myristic acid | 0.11 |
| Lauric acid | 0.01 |
| >$C_{18}$ sat.acids | 0.00 |
| Free hydroxyl | 0.04 |

The polyester had a solid fat content of about 14% at 37.8° C. The yield value of the polyester at that temperature was also measured using the method described hereinbefore. The yield value was found to be essentially 0 Pa, showing clearly that $N_c$ was above 14%.

The PY-value obtained by inserting the appropriate figures in the formula given earlier, i.e.: $2.94*y + 2.1*x + 16.6*yz + 2.7*xz + 14.6*xy - 0.26$, was found to be 0.22.

The above polyester can suitably be used to prepare a pourable bakery margarine having an $N_{20}$ of more than 15 and a yield value, measured by means of a Ferranti Shirley ™ viscometer as described hereinbefore, of less than 700 Pa.

EXAMPLE 2

The measurement of Example 1 was repeated for a sucrose polyester of the following composition:

| Fatty acid residue | mol fraction |
| --- | --- |
| Linoleic acid | 0.06 |
| Oleic acid | 0.08 |
| Elaidic acid | 0.06 |
| Stearic acid | 0.17 |
| Palmitic acid | 0.59 |
| Myristic acid | 0.01 |
| Lauric acid | 0.00 |
| >$C_{18}$ sat.acids | 0.00 |
| Free hydroxyl | 0.02 |

The polyester had a solid fat content of about 37% at 37.8° C. The yield value at that temperature was found to be essentially 0 Pa, indicating that the $N_c$-value is substantially above 37%. The PY-value calculated on the basis of the formula given hereinbefore was −0.00.

From the above polyester a pourable bakery margarine can be prepared having an $N_{20}$ of more than 15 and a yield value (Ferranti Shirley ™ viscometer) of less than 700 Pa.

EXAMPLE 3

The measurement of Example 1 was repeated for a sucrose polyester of the following composition:

| Fatty acid residue | mol fraction |
| --- | --- |
| Linoleic acid | 0.08 |
| Oleic acid | 0.05 |
| Elaidic acid | 0.10 |
| Stearic acid | 0.12 |
| Palmitic acid | 0.60 |
| Myristic acid | 0.01 |
| Lauric acid | 0.00 |
| >$C_{18}$ sat.acids | 0.00 |
| Free hydroxyl | 0.04 |

The polyester had a solid fat content of about 27% at 37.8° C. The yield value at that temperature was found to be essentially 0 Pa. The $N_c$-value therefore has to be above 27%. The PY-value was calculated to be 0.20.

From the above polyester a pourable bakery margarine can be prepared having an $N_{20}$ of more than 15 and a yield value (Ferranti Shirley ™ viscometer) of less than 700 Pa.

EXAMPLE 4

The measurement of Example 1 was repeated for a sucrose polyester of the following composition:

| Fatty acid residue | mol fraction |
| --- | --- |
| Linoleic acid | 0.01 |
| Oleic acid | 0.11 |
| Elaidic acid | 0.00 |
| Stearic acid | 0.03 |
| Palmitic acid | 0.57 |
| Myristic acid | 0.16 |
| Lauric acid | 0.06 |
| Decanoic acid | 0.04 |
| >$C_{18}$ sat.acids | 0.01 |
| Free hydroxyl | 0.03 |

The polyester had a solid fat content of about 29% at 30.0° C. The yield value at that temperature was found to be essentially 0 Pa, indicating that the $N_c$-value has to be above 29%. The PY-value was calculated to be 1.05.

The above polyester can suitably be used to prepare a pourable bakery margarine having an $N_{20}$ of more than 15 and a yield value (Ferranti Shirley ™ viscometer) of less than 700 Pa.

EXAMPLE 5

The measurement of Example 1 was repeated for a sucrose polyester of the following composition:

| Fatty acid residue | mol fraction |
| --- | --- |
| Linoleic acid | 0.01 |
| Oleic acid | 0.01 |
| Elaidic acid | 0.00 |
| Stearic acid | 0.35 |
| Palmitic acid | 0.02 |
| Myristic acid | 0.48 |
| Lauric acid | 0.12 |
| >$C_{18}$ sat.acids | 0.00 |
| Free hydroxyl | 0.01 |

The polyester had a solid fat content of about 30% at 37.8° C. The yield value at that temperature was found to be essentially 0 Pa, signifying that the polyester had an $N_c$-value above 30%. The PY-value was calculated to be −0.09.

The polyester can be used to prepare a pourable margarine or shortening having an $N_{20}$ of more than 15 and a yield value (Ferranti Shirley ™ viscometer) of less than 700 Pa.

EXAMPLE 6

A pumpable margarine was prepared having the following formulation:

| Ingredient | % by weight |
| --- | --- |
| fat phase | 83 |
| monoglyceride [1] | 0.15 |
| lecithin [2] | 0.15 |
| minor ingredients [3] | 0.15 |
| sodium chloride | 0.2 |
| whey protein [4] | 0.25 |
| potassium sorbate | 0.1 |
| water | balance |

[1] Admul 6203 TM (ex Unimills, Zwijndrecht, the Netherlands)
[2] Bolec ZTD TM (ex Unimills, Zwijndrecht, the Netherlands)
[3] flavouring and colouring agent
[4] Lacprodan 80 TM (ex Danmark Protein AS, Århus, Danmark)

The composition of the fat phase was as follows:

| ingredient | % by weight |
| --- | --- |
| Sucrose polyester | 30 |
| sunflower oil | 30 |
| bean oil | 3 |
| rape seed oil hardened to 28° C. | 10 |
| rape seed oil hardened to 32° C. | 13 |
| fish oil hardened to 35° C. | 14 |

The sucrose polyester had the following fatty acid residue composition:

| Fatty acid residue | mol fraction |
| --- | --- |
| Linoleic acid | 0.02 |
| Oleic acid | 0.17 |
| Elaidic acid | 0.23 |
| Stearic acid | 0.06 |
| Palmitic acid | 0.48 |
| Myristic acid | 0.02 |
| Lauric acid | 0.00 |
| <$C_{12}$ acids | 0.00 |
| >$C_{18}$ sat.acids | 0.00 |
| Free hydroxyl | 0.01 |

The PY value for the sucrose polyester is calculated to be 0.15. The $N_c$-value for the polyester is found to be above 17%.

The margarine was prepared on micro-scale (4.0–4.5 kg/hr) by admixing the separately prepared aqueous phase and fat phase in a pre-emulsion vessel and subsequently passing the pre-emulsion, having a temperature of about 55° C. through a pin-crystalliser mixer, two scraped surface heat exchangers (A-unit) and a pin-crystalliser (C-unit). Recirculation (200%) between the second A-unit and the mixer has been applied. The processing conditions employed were as follows:

| Unit | mixer | A-unit | A-unit | C-unit |
| --- | --- | --- | --- | --- |
| rotation speed | 250 rpm | 1200 rpm | 1200 rpm | 250 rpm |
| jacket temperature | ambient | −15° C. | −12° C. | 12° C. |
| exit temperature | 26° C. | 13° C. | 12° C. | 14° C. |
| solid fat content | 6% | 14% | 21% | 19% |

The N value of the fat phase at 20° C. was 19%. The margarine appeared to have an $S_{20}$ value of 8 g. The yield value of this margarine was 400 Pa (Ferranti Shirley TM viscometer).

EXAMPLE 7

Three pumpable margarines were prepared in the manner described in Example 6, with the exception that the fat phase composition was changed.

| | 7A | 7B | 7C |
| --- | --- | --- | --- |
| Margarine | % by weight | | |
| Sucrose polyester 1 | — | — | 10 |
| Sucrose polyester 2 | 30 | — | 10 |
| Sucrose polyester 3 | — | 30 | 10 |
| sunflower oil | 40 | 45 | 30 |
| bean oil | 3 | 2 | 3 |
| rape 28 | 7 | 6 | 10 |
| rape 32 | 10 | 8 | 13 |
| fish 35 | 10 | 9 | 14 |

The sucrose polyesters (SPE) had the following fatty acid residue composition, PY value and $N_c$ value:

| | SPE 1 | SPE 2 | SPE 3 |
| --- | --- | --- | --- |
| Fatty acid residue | molar fraction | | |
| Linoleic acid | 0.02 | 0.00 | 0.00 |
| Oleic acid | 0.17 | 0.00 | 0.00 |
| Elaidic acid | 0.23 | 0.01 | 0.01 |
| Stearic acid | 0.06 | 0.18 | 0.28 |
| Palmitic acid | 0.48 | 0.26 | 0.34 |
| Myristic acid | 0.02 | 0.12 | 0.09 |
| Lauric acid | 0.00 | 0.37 | 0.24 |
| <$C_{12}$ acids | 0.00 | 0.04 | 0.02 |
| >$C_{18}$ sat.acids | 0.00 | 0.00 | 0.01 |
| Free hydroxyl | 0.01 | 0.01 | 0.01 |
| PY value | 0.15 | −0.21 | 0.10 |
| $N_c$ value | >17% | >21% | >43% |

The solid fat contents during production, the $N_{20}$ values of the fat phase, the $S_{20}$ values and the yield values (Ferranti Shirley TM viscometer) are given below:

| solid fat content | 7A | 7B | 7C |
| --- | --- | --- | --- |
| after mixer | 10 | 14 | 9 |
| after A1 | 22 | 24 | 19 |
| after A2 | 24 | 24 | 22 |
| after C | 25 | 25 | 22 |
| $N_{20}$ | 29 | 30 | 30 |
| $S_{20}$ | 29 | 31 | 21 |
| yield value | 900 | 990 | 720 |

EXAMPLE 8

Pumpable shortenings were prepared in a similar manner as described in example 6. The composition of the shortenings was as follows:

| | 8A | 8B |
| --- | --- | --- |
| Shortening | % by weight | |
| Sucrose polyester 1 | 10 | — |
| Sucrose polyester 2 | 10 | 30 |
| Sucrose polyester 3 | 10 | — |
| sunflower oil | 30 | 40 |
| bean oil | 3 | 3 |
| rape 28 | 10 | 7 |
| rape 32 | 13 | 10 |
| fish 35 | 14 | 10 |

The fatty acid residue composition of the sucrose polyesters was exactly the same as that of the same sucrose polyesters mentioned in Example 7.

The solid fat content after production, the $N_{20}$ values, and the $S_{20}$ values are given below:

| Shortening | 8A | 8B |
|---|---|---|
| solid fat content (N) immediately after processing | 27 | 27 |
| $N_{20}$ | 30 | 28 |
| $S_{20}$ | 32 | 53 |

Shortenings A and B were found to be easy pourable.

EXAMPLES 9-32

The mixtures of polyol fatty acid polyesters of Tables 1-4 further illustrate the invention.

Some mixtures have been composed by blending two or more SPE mixtures originating from separate chemical preparations. They can be distinguished from a mixture originating from one chemical preparation, e.g. in that the fatty acids residues of the latter mixture are distributed randomly over all hydroxyl positions in contrast to a blend which is made after the preparation of the constituents. All suitable and preferred embodiments mentioned before for not-blended SPE-mixtures are applicable as well as for the blended ones.

Newtonian behaviour for polyesters having a solid fat content exceeding 8% is apparent either form the $N_c$-value or from the determined values for yield and solid fat content at a specific temperature.

TABLE 1

| Fatty acid residue | Ex.9 | Ex.10 | Ex.11 | Ex.12 | Ex.13 | Ex.14 |
|---|---|---|---|---|---|---|
| | | | molar fraction | | | |
| Linoleic acid | 0.00 | 0.00 | 0.00 | 0.00 | 0.12 | 0.01 |
| Oleic acid | 0.19 | 0.00 | 0.00 | 0.13 | 0.09 | 0.00 |
| Elaidic acid | 0.00 | 0.00 | 0.00 | 0.02 | 0.20 | 0.00 |
| Stearic acid | 0.00 | 0.00 | 0.02 | 0.17 | 0.24 | 0.17 |
| Palmitic acid | 0.78 | 0.01 | 0.61 | 0.19 | 0.26 | 0.01 |
| Myristic acid | 0.00 | 0.97 | 0.01 | 0.47 | 0.01 | 0.72 |
| Lauric acid | 0.00 | 0.01 | 0.35 | 0.00 | 0.00 | 0.07 |
| <$C_{12}$ acids | 0.02 | 0.00 | 0.00 | 0.00 | 0.00 | 0.00 |
| >$C_{18}$ sat. acids | 0.01 | 0.00 | 0.00 | 0.01 | 0.00 | 0.00 |
| Free hydroxyl | 0.00 | 0.01 | 0.01 | 0.00 | 0.06 | 0.01 |
| $N_c$ value | | | | | | 47 |
| Yield (Pa) | 0 | 0 | 0 | 0 | 0 | |
| Temp. (°C.) | 37.8 | 33.5 | 37.8 | 32.3 | 30 | 1 |
| N value % | 18.4 | 61.2 | 21.7 | 22.3 | 15.3 | |
| PY | 1.94 | 0.32 | 0.85 | −0.59 | 0.31 | −1.15 |
| Blend (see tables 5,6) | no blend | no blend | no blend | no blend | no blend | A |

[1] Temperatures investigated: 32.3-37.8° C.

TABLE 2

| Fatty acid residue | Ex.15 | Ex.16 | Ex.17 | Ex.18 | Ex.19 | Ex.20 |
|---|---|---|---|---|---|---|
| | | | molar fraction | | | |
| Linoleic acid | 0.01 | 0.02 | 0.04 | 0.02 | 0.06 | 0.03 |
| Oleic acid | 0.02 | 0.03 | 0.05 | 0.03 | 0.09 | 0.04 |
| Elaidic acid | 0.01 | 0.02 | 0.04 | 0.02 | 0.10 | 0.04 |
| Stearic acid | 0.03 | 0.07 | 0.10 | 0.17 | 0.34 | 0.15 |
| Palmitic acid | 0.13 | 0.24 | 0.36 | 0.21 | 0.09 | 0.04 |
| Myristic acid | 0.77 | 0.58 | 0.39 | 0.49 | 0.29 | 0.68 |
| Lauric acid | 0.01 | 0.01 | 0.00 | 0.04 | 0.00 | 0.01 |
| <$C_{12}$ acids | 0.00 | 0.00 | 0.00 | 0.00 | 0.00 | 0.00 |
| >$C_{18}$ sat. acids | 0.01 | 0.01 | 0.01 | 0.01 | 0.01 | 0.01 |
| Free hydroxyl | 0.02 | 0.02 | 0.02 | 0.02 | 0.02 | 0.02 |
| $N_c$ value | 45 | 42 | 43 | 47 | 17 | |
| Yield (Pa) | | | | | | 0 |
| Temp. (°C.) | 1 | 1 | 1 | 1 | 1 | 32.3 |
| N value % | | | | | | 35.2 |
| PY | 0.31 | 0.16 | 0.15 | −0.56 | 0.47 | −1.00 |
| Blend (see tables 5,6) | B | C | D | E | F | G |

[1] Temperatures investigated: 32.3-37.8° C.

TABLE 3

| Fatty acid residue | Ex.21 | Ex.22 | Ex.23 | Ex.24 | Ex.25 | Ex.26 |
|---|---|---|---|---|---|---|
| | | | molar fraction | | | |
| Linoleic acid | 0.16 | 0.16 | 0.12 | 0.03 | 0.00 | 0.00 |
| Oleic acid | 0.25 | 0.25 | 0.18 | 0.15 | 0.00 | 0.00 |
| Elaidic acid | 0.17 | 0.17 | 0.13 | 0.21 | 0.01 | 0.01 |
| Stearic acid | 0.24 | 0.16 | 0.18 | 0.13 | 0.24 | 0.21 |
| Palmitic acid | 0.16 | 0.22 | 0.36 | 0.44 | 0.25 | 0.27 |
| Myristic acid | 0.00 | 0.01 | 0.01 | 0.02 | 0.11 | 0.11 |
| Lauric acid | 0.00 | 0.00 | 0.00 | 0.00 | 0.34 | 0.34 |
| <$C_{12}$ acids | 0.00 | 0.00 | 0.00 | 0.00 | 0.04 | 0.04 |
| >$C_{18}$ sat. acids | 0.01 | 0.01 | 0.01 | 0.01 | 0.01 | 0.01 |
| Free hydroxyl | 0.02 | 0.02 | 0.02 | 0.01 | 0.01 | 0.01 |
| $N_c$ value | | | | | | |
| Yield (Pa) | 0 | 0 | 0 | 0 | 0 | 0 |
| Temp. °C. | 20 | 20 | 37.5 | 37.5 | 42.5 | 37.5 |
| N value % | 23.9 | 24.8 | 23.1 | 16.4 | 13.4 | 24.3 |
| PY | 0.67 | −0.00 | −0.11 | −0.12 | 0.04 | −0.11 |
| Blend (see tables 5 and 6) | #77 | #78 | #82 | #80 | #79 | #83 |

TABLE 4

| Fatty acid residue | Ex.27 | Ex.28 | Ex.29 | Ex.30 |
|---|---|---|---|---|
| | | molar fraction | | |
| Linoleic acid | 0.12 | 0.03 | 0.00 | 0.00 |
| Oleic acid | 0.18 | 0.15 | 0.00 | 0.00 |
| Elaidic acid | 0.13 | 0.21 | 0.00 | 0.00 |
| Stearic acid | 0.15 | 0.10 | 0.00 | 0.12 |
| Palmitic acid | 0.39 | 0.47 | 0.00 | 0.30 |
| Myristic acid | 0.01 | 0.02 | 0.87 | 0.41 |
| Lauric acid | 0.00 | 0.00 | 0.09 | 0.16 |
| <$C_{12}$ acids | 0.00 | 0.00 | 0.00 | 0.00 |
| >$C_{18}$ sat.acids | 0.01 | 0.01 | 0.00 | 0.00 |
| Free hydroxyl | 0.02 | 0.01 | 0.04 | 0.01 |
| $N_c$ value | | | | |
| Yield (Pa) | 0 | 0 | 30 | 100 |
| Temp. °C. | 40 | 35 | 33.5 | 33.5 |
| N value % | 18.8 | 22.8 | 46.2 | 49.2 |
| PY | −0.15 | −0.01 | −0.04 | −0.16 |
| Blend (see tables 5 and 6) | #86 | #84 | no blend | no blend |

The blends which have been used in examples 14-28 are specified in Tables 5 and 6. The blends have been prepared partially from polyesters which have been mentioned in the previous examples. The remaining polyesters are specified in Table 7.

TABLE 5

| Components (sucrose polyester) | BLENDS (% by weight) | | | | | | | |
|---|---|---|---|---|---|---|---|---|
| | A | B | C | D | E | F | G | #77 |
| SPE4 [1] | | | | | | | | 20 |
| SPE5 [1] | | | | | | | | |
| SPE7 [1] | | | | | | | | 80 |
| SPE6 [1] | | | | | | | | |
| W15 | | | | | | 70 | 30 | |
| see Ex.2 | | 20 | 40 | 60 | 33.3 | | | |
| see Ex.5 | 50 | | | | 33.3 | | | |
| see Ex.10 | 50 | 80 | 60 | 40 | 33.3 | 30 | 70 | |
| see Ex.7A | | | | | | | | |

TABLE 5-continued

| Components (sucrose polyester) | BLENDS (% by weight) | | | | | | | |
|---|---|---|---|---|---|---|---|---|
| | A | B | C | D | E | F | G | #77 |
| see Ex.7B | | | | | | | | |

[1] see TABLE 7

TABLE 6

| Components (sucrose polyester) | BLENDS (% by weight) | | | | | | |
|---|---|---|---|---|---|---|---|
| | #78 | #82 | #80 | #79 | #83 | #86 | #84 |
| SPE4 [1] | | 8 | 8 | 8 | | | |
| SPE5 [1] | 20 | | | | 8 | 8 | 8 |
| SPE7 [1] | 80 | 46 | | | | 46 | |
| SPE6 [1] | | | | | | | 46 |
| see Ex.2 | | | | | | | |
| see Ex.5 | | 46 | | | | | |
| see Ex.10 | | | | | | | |
| see Ex.7A | | | 92 | | | | 92 |
| see Ex.7B | | | | 92 | 92 | | |

[1] see TABLE 7

For making the blends specified in the previous tables use is made of sucrose fatty acid polyesters which have not yet been mentioned before and which are specified in Table 7.

TABLE 7

| Fatty acid residue of sucrose polyesters | SPE4 | SPE5 | SPE6 | SPE7 |
|---|---|---|---|---|
| Linoleic acid | 0.00 | 0.00 | 0.00 | 0.00 |
| Oleic acid | 0.00 | 0.00 | 0.25 | 0.53 |
| Elaidic acid | 0.00 | 0.00 | 0.09 | 0.20 |
| Stearic acid | 0.83 | 0.45 | 0.49 | 0.07 |
| Palmitic acid | 0.14 | 0.49 | 0.13 | 0.16 |
| Myristic acid | 0.01 | 0.02 | 0.02 | 0.01 |
| Lauric acid | 0 00 | 0.02 | 0.01 | 0.00 |
| $<C_{12}$ acids | 0.00 | 0.00 | 0.00 | 0.00 |
| $>C_{18}$ sat.acids | 0.01 | 0.01 | 0.01 | 0.01 |
| Free hydroxyl | 0.02 | 0.02 | 0.02 | 0.02 |

What is claimed is:

1. Fat composition comprising one or more polyol fatty acid polyesters, which exhibits Newtonian rheology at a $N_c$ of at least 15%, and with a fatty acid distribution which complies with the conditions:

$PY<1.1$ where $PY = 2.94*y + 2.1*x + 16.6*y^2 + 2.7*x^2 + 14.6*xy - 0.6$ wherein $x=[P]-[M]$, $y=[S]-[P]$ and PY means predicted yield and which in the same time complies with each of the following conditions:

$[B]<0.35$ either $[P]<0.40$ or $[P]>0.64$
and $[L]<0.15$, wherein
[P] is the molar fraction of palmitic acid residues, [M] is the molar fraction of myristic acid residues and [S] is the molar fraction of stearic acid and longer saturated fatty acid residues, [B] is the molar fraction of lauric and shorter fatty acid residues, [L] is the molar fraction of saturated fatty acid residues having a carbon chain length of at least 20.

2. Fat composition according to claim 1, wherein the mixture of polyol fatty acid polyesters has a solid fat content of at least 15% at a temperature of 20° C.

3. Fat composition according to claim 1, wherein unsaturated fatty acid residues and lauric and shorter then lauric fatty acid residues together constitute less than 50 mol. % of the total amount of fatty acid residues present in the polyester mixture.

4. Fat composition according to claim 1, wherein myristic, palmitic and stearic fatty acid residues constitute at least 45 mol. % of the total amount of fatty acid residues present in the polyester mixture.

5. Fat composition according to claim 1, wherein the mixture of polyesters has an $N_{35}$-value of at least 5%.

6. Flowable fat product comprising at least 50 wt. % fat, which fat essentially consists of up to 80% triglycerides an done or more polyol fatty acid polyesters and which product at 20° C. contains at least 8% solid fat by weight of the total amount of fat wherein the fatty acid residue composition of the mixture of polyol fatty acid polyesters is such that the following condition is met:

$2.94*y + 2.1*x + 16.6*y^2 + 2.7*x^2 + 14.6*xy - 0.26 < 3.9$, wherein $x=[P]-[M]$, $y=[S]-[P]$, wherein [P] is the molar fraction of palmitic acid residues, [M] is the molar fraction of myristic acid residues and [S] is the molar fraction of stearic and longer saturated fatty acid residues.

7. Flowable product according to claim 6, which product at 20° C. contains at least 12% solid fat by weight of the total amount of fat.

8. Flowable product according to claim 6, which product at 20° C. contains at least 15% solid fat by weight of the total mount of fat.

9. Flowable product according to claim 7, wherein p1 $2.94*y + 2.1*x + 16.6*yz + 2.7*xz + 14.6*xy - 0.26 < 1.1$.

10. Flowable product according to claim 6, wherein the mixture of polyol fatty acid polyesters constitutes at least 40 wt. % of the total amount of fat.

11. Fat composition comprising a mixture of two or more polyol fatty acid polyesters, which mixture exhibits Newtonian rheology a $N_c$ exceeding 8%, and with a fatty acid distribution which complies with the condition:

$PY<3.9$ where $PY = 2.94*y + 2.1*x + 16.6*yz + 2.7*xz + 14.6*xy - 0.26$ wherein $x=[P]-[M]$ and $y=[S]-[P]$,

[P] is the molar fraction of palmitic acid residues, [M] is the molar fraction of myristic acid residues and [S] is the molar fraction of stearic acid and longer saturated fatty acid residues, which composition comprises a blend of at least two polyol fatty acid polyester mixtures, of which each mixture originates from a separate chemical preparation.

* * * * *